Patented Mar. 13, 1934

1,950,889

UNITED STATES PATENT OFFICE 1,950,889

PROCESS FOR THE PURIFICATION OF TERTIARY BUTYL ALCOHOL

William W. Hartman, Rochester, N. Y., assignor to Eastman Kodak Company, Rochester, N. Y., a corporation of New York No Drawing. Application June 2, 1931,
Serial No. 541,691

6 Claims. (Cl. 260—156)

This invention relates to processes for the purification of organic compounds and more particularly to processes wherein phthalic anhydride is employed to combine with the substance it is desired to remove and wherein separation of the purified compound is accomplished by distillation. The invention relates particularly to the dehydration of organic acids and certain aliphatic alcohols by treatment with phthalic anhydride.

Numerous methods for the dehydration or purification of alcohols and acids have been developed heretofore. These include treatment of the alcohol or acid with various dehydrating agents, extraction by means of solvents, and azeotropic distillation. In the case of extraction of an acid or alcohol from its dilute solution in water, it is treated with an extracting agent which is a good solvent for the material desired to be recovered, but which is insoluble, or nearly insoluble, in water, said agent also having a boiling point differing sufficiently from that of the compound treated to enable it to be separated therefrom by distillation. The dehydration by means of dehydrating agents has heretofore generally been accomplished by the use of certain salts of deliquescent character which take up the water present, after which the desired material is usually obtained by decantation followed by distillation. Aqueous solutions of alcohols and acids have also been dehydrated by distillation with a third liquid which forms an azeotropic mixture of constant boiling point, either with the water or with the compound it is desired to obtain in dehydrated condition.

Until the present invention, so far as I am aware, the use of phthalic anhydride in accordance with the herein described method has never been suggested for the purpose of purifying or dehydrating an alcohol or acid. Furthermore, from the known propensity of this compound to form esters in the presence of alcohol it was not to be expected that it could be used to dehydrate an alcohol or that it might have a selective reactivity with respect to one of a mixture of alcohols.

This invention has an object to provide an improved and simple method for the dehydration and purification of alcohols. A further object is to provide a similar method for the dehydration of aliphatic acids. Another object is to provide a method of separating two alcohols by means of a substance which will react selectively with one of them while leaving the other substantially unaffected. A specific object of the invention is to provide a method of dehydration of alcohols or acids in which the dehydrating medium may be effectively regenerated by the simple expedient of heating, and may thereafter be introduced into the succeeding batch of material. Other objects will appear hereinafter.

These objects are accomplished by the following invention which comprises mixing with the compound to be purified or dehydrated an amount of phthalic anhydride representing a slight excess with respect to the water content or other constituent of said alcohol or acid which it is desired to remove, heating or refluxing the mixture for a length of time sufficient for the anhydride to combine with the water or other constituent and removing the purified material from the reaction mixture by distillation. Where alcohol separation is involved, the phthalic half ester is produced and following removal by distillation of the purified alcohol, may be utilized as seen fit. Where dehydration is involved, phthalic acid is produced and may be regenerated to phthalic anhydride by the mere expedient of heating.

One of the principal features of the present invention is that in the dehydration of alcohols, phthalic anhydride has a greater tendency to react with water to form phthalic acid than it does to react with the alcohol to form the corresponding ester. Another feature is that the phthalic anhydride has a greater reactivity toward some alcohols than others, and that they may be separated one from another by treatment with this compound by the formation of the half ester of phthalic acid with one of them. Still another feature of the process lies in the fact that the phthalic acid may be regenerated to phthalic anhydride by the simple expedient of heating, whereupon the phthalic acid decomposes with the re-formation of phthalic anhydride which may be introduced into a further batch of material to be treated. It will thus be evident that, since the phthalic anhydride can be regenerated, it may be used over and over in succeeding operations with consequent economy of operation.

The following examples in which I have set forth several of the preferred embodiments of my invention are included merely for the purpose of illustration and not as a limitation.

In carrying out each of the operations described below a Claissen flask of 200 c. c. capacity, having an 8" imbedded column, was employed, together with the usual condenser and receivers.

Five grams of water was added to 100 grams of a pure tertiary butyl alcohol having a melting point of 20–21° C. The melting point of the mixture was 0–7° C. The mixture was then distilled with the following results:

| Fraction | Weight | B. P. | M. P. |
|---|---|---|---|
|  | Grams |  |  |
| 1 | 4.4 | 79.8° | −3° to +3° |
| 2 | 7.3 | 79.8–79.9° | −3° to +3° |
| 3 | 17.2 | 79.9–80° | −3° to +3° |
| 4 | 15.0 | 80 –80.2° | −2° to +5° |
| 5 | 24.7 | 80.2–80.4° | 0° to 6° |
| 6 | 12.8 | 80.4–80.9° | 4° to 10° |
| 7 | 9.1 | 80.9–81.3° | 8° to 12° |
| 8 | 10.2 | 81.3–82° | 15° to 16° |

The above data prove quite conclusively that an ordinary distillation is unsatisfactory for the dehydration of hydrous tertiary butyl alcohol.

As illustrating the improved result to be obtained by the use of phthalic anhydride in accordance with the principles of my invention, a run was made as follows:

*Example I.*—To 100 grams of pure tertiary butyl alcohol having the above indicated melting point, was added 5 grams of water, and enough phthalic anhydride to react with the water plus a 5% excess. After three hours of heating at reflux temperature, the material was distilled with the following results:

| Fraction | Weight | B. P. | M. P. |
|---|---|---|---|
|  | Grams |  |  |
| 1 | 6.4 | 81.4–81.6° | 17.5–18.5° |
| 2 | 10.6 | 81.6° | 18 –19° |
| 3 | 17.1 | 81.6–81.8° | 19 –20° |
| 4 | 20.6 | 81.8° | 19.5–20.5° |
| 5 | 17.0 | 81.8–82° | 20 –21° |
| 6 | 13.8 | 82 –82.1° | 21 –22° |

An examination of the above table discloses that a single distillation in the presence of a slight excess of phthalic anhydride is sufficient to produce practically pure anhydrous tertiary butyl alcohol.

A run was then made to determine whether or not a mixture of tertiary butyl and normal butyl alcohols could be separated by ordinary distillation. Ten grams of normal butyl alcohol was added to 100 grams of tertiary butyl alcohol, the latter having a melting point of 20–21° C. The melting point of the mixture was about 0° C. Upon distillation the following results were obtained:

| Fraction | Weight | B. P. | M. P. |
|---|---|---|---|
|  | Grams |  |  |
| 1 | 6.0 | 81.6–82.4° | 14.5–16.5° |
| 2 | 17.0 | 82.4–82.6° | 14.5–16.5° |
| 3 | 10.8 | 82.6–83° | 17.5–19° |
| 4 | 18.2 | 83 –83.8° | 17.5–19° |
| 5 | 17.7 | 83.8–85° | 17 –19° |
| 6 | 13.7 | 85 –86.2° | 15 –18° |
| 7 | 10.2 | 86.2–90° | 12 –15° |
| 8 | 6.0 | 90 –95° | −3° to +8° |
| 9 | 8.8 | 95 –117° | No crystals to −8° |

The above data clearly indicate that at best only a partial separation of tertiary butyl alcohol from normal butyl alcohol may be accomplished by a single distillation in the absence of other dehydrating means.

As illustrating the improved result to be obtained by the use of phthalic anhydride in accordance with the principles of my invention a run was made as follows:

*Example II.*—To 100 grams of tertiary butyl alcohol having a melting point of 20–21° C. was added 10 grams of normal butyl alcohol and then enough phthalic anhydride to react with the normal butyl alcohol plus a 5% excess. The results of a single distillation are indicated in the following table:

| Fraction | Weight | B. P. | M. P. |
|---|---|---|---|
|  | Grams |  |  |
| 1 | 5.1 | 82.2–82.6° | 21–22° |
| 2 | 19.5 | 82.6–82.8° | 21–22° |
| 3 | 24.9 | 82.8–83.4° | 21–22° |
| 4 | 11.4 | 83.4–83.8° | 20–21° |
| 5 | 16.1 | 83.8–84° | 19–20° |
| 6 | 4.8 | 84 –84.8° | 19–20° |

From the above data, it will readily be seen that a mixture of tertiary butyl and normal butyl alcohols may be separated by distillation with an amount of phthalic anhydride equivalent to the normal butyl alcohol or in slight excess with respect thereto.

*Example III.*—As further illustrating the effectiveness of my invention in the purification of tertiary alcohols about 10,000 grams of commercial tertiary butyl alcohol and about 500 grams of phthalic anhydride were refluxed for an hour and thereafter distilled. The distillate was found to be substantially pure tertiary butyl alcohol having a melting point of 19–20° C.

*Example IV.*—As illustrating the application of my invention to the dehydration of acids, the following data are given. Five grams of water was added to 100 grams of a pure formic acid having a melting point of about 7–8° C. The mixture was then treated with the theoretical amount of phthalic anhydride necessary to form phthalic acid with the water added plus a 5% excess. The mixture was refluxed for three hours after which a single distillation gave the following results:

| Fraction | Weight | B. P. | M. P. |
|---|---|---|---|
| 1 | 9.0 | 100 –100.8° | 7.8° |
| 2 | 28.8 | 100.8–101.2° | 7.8° |
| 3 | 25.0 | 101.2–102° | 7.5° |
| 4 | 19.5 | 102 –102.6° | 7.5° |
| 5 | 14.3 | 102.6–103.8° | 5.8° |

The above data indicate clearly that the treatment of the formic acid with phthalic anhydride enables a highly purified acid to be obtained upon a single distillation.

As illustrating the fact that the improved results to be obtained by the use of my process cannot be obtained under ordinary circumstances the following data, representing distillation of 100 grams of formic acid of melting point 7–8° C. to which 5 grams of water but no phthalic anhydride had been added are given below:

| Fraction | Weight | B. P. | M. P. |
|---|---|---|---|
| 1 | 6.5 | 102 –102.4° | 5.3° |
| 2 | 17.7 | 102.4–102.8° | 5.1° |
| 3 | 17.8 | 102.8–103.4° | 4.7° |
| 4 | 24.8 | 103.4–104° | 2.4° |
| 5 | 8.2 | 104 –104.6° | 0° |
| 6 | 16.3 | 104.6–105.6° | −2° |
| 7 | 10.1 | 105.6–107.4° | Below −8° |

It will be evident from the above results that a pure formic acid cannot be prepared by a single distillation of a mixture having the indicated percentage of water.

*Example V.*—As illustrating the application of the present process to the purification of an impure commercial acid the following run was made:

4,500 grams of phthalic anhydride was added to 5,000 grams of an 85–90% commercial formic acid having a melting point below −10° C. The mixture was warmed for an hour on a steam bath, and then distilled at a pressure slightly below atmospheric and the distillate collected and condensed. The product had a melting point of about 7–8° C. indicating a substantially complete dehydration of the impure formic acid.

In each of the above examples involving dehydration only, it was found possible to regenerate the phthalic anhydride by simply heating the phthalic acid resulting from the reaction between the original phthalic anhydride and the water it was desired to remove. For example, the phthalic acid produced in the dehydration of the tertiary butyl alcohol of Example 1 was heated and decomposed at a temperature of about 184° C. to form phthalic anhydride, which could then be introduced into a subsequent batch of material to be dehydrated.

I have discovered that phthalic anhydride has a greater tendency to form phthalic acid with the water present in certain alcohols than it does to form the corresponding ester with the alcohol. I have found that the herein described process is of especial value in the dehydration of tertiary butyl alcohol, although it has not proved to be applicable to the treatment of ethyl alcohol and no claim to its use for this purpose is made.

I have also found that the process is particularly valuable for the dehydration of organic acids, especially formic and acetic acids the phthalic anhydride here functioning only to combine with the water present and having no tendency to form other compounds with the acids themselves.

As illustrated by the above examples, the process may be effectively applied to the separation of normal butyl alcohol from tertiary butyl alcohol by virtue of the tendency of phthalic anhydride to form a half ester with normal butyl alcohol and not with tertiary butyl alcohol.

In general it may be said that my invention contemplates broadly the purification of organic compounds by the addition thereto of a compound (phthalic anhydride) which reacts more readily with the compound or impurity it is desired to remove than with the compound it is desired to obtain in purified form.

While I have given above the preferred conditions under which my process may be operated, many variations in the details therein may be made within the scope of the invention. For example, I may carry out the distillation under ordinary atmospheric pressure or at pressures below atmospheric. It will be apparent to those skilled in the art that distillation at subatmospheric pressures may sometimes be advantageous, especially when it is desired to keep the distillation temperature as low as possible, as in the case of compounds which have a tendency to decompose at only moderately high temperatures.

The time of refluxing may also vary considerably in accordance with the material treated, especially with reference to the amount of water or other material present in the compound undergoing purification. Although I have disclosed heating or refluxing periods of one to three hours this may be varied within wide limits. For example, I may carry out the refluxing for not more than a half hour in some cases and more than three hours in others. It may be said in general that the refluxing of a mixture of phthalic anhydride and aqueous alcohol, or of anhydride and aqueous acid, should be carried out for a length of time sufficient to enable the anhydride completely to react with the water present and the consequent formation of phthalic acid. In the case of separating a mixture of alcohols, the more reactive the alcohol to be purified, the shorter should be the time of refluxing. The amount of phthalic anhydride to be used in dehydrations will also depend upon the amount of water present in the material to be dehydrated and should preferably be in slight excess with respect to the water. A less amount may be used if it is desired to remove less than all of the water. The same principle holds true with respect to an excess of phthalic anhydride in relation to the amount of a given alcohol it may be desired to remove from a mixture. The temperature at which the mixture of phthalic anhydride and hydrous alcohol or acid is heated or refluxed previous to distillation will also vary in accordance with the particular alcohol or acid being treated.

The process herein disclosed provides a simple, effective and economical method of purifying organic compounds and in particular for dehydrating aliphatic acids and tertiary alcohols and for the separation of a mixture of alcohols. It is particularly adapted to the dehydration of tertiary butyl alcohol and formic acid. Economy of operation is assured due to the fact that the phthalic anhydride may be easily regenerated by simply heating the phthalic acid formed in the dehydration reaction and the regenerated anhydride introduced into a subsequent batch of material. Other aliphatic acids which may be dehydrated according to my process are acetic, propionic, butyric acids and the like.

What I claim is:

1. A process of dehydrating aqueous tertiary butyl alcohol which comprises refluxing said alcohol with an excess of phthalic anhydride with respect to the water content and then distilling the dehydrated alcohol from said mixture.

2. A process of dehydrating aqueous tertiary butyl alcohol which comprises heating said alcohol with an amount of phthalic anhydride substantially equivalent to the water to be removed for a sufficient length of time for the phthalic anhydride to react with substantially all of the water, and removing the dehydrated alcohol from said mixture by distillation.

3. A process of dehydrating aqueous tertiary butyl alcohol which comprises adding phthalic anhydride thereto in excess with respect to the water content of said alcohol, refluxing the resulting mixture for ½ to 3 hours, distilling dehydrated tertiary butyl alcohol from the mixture, heating the phthalic acid formed in the reaction to regenerate phthalic anhydride, and introducing the regenerated anhydride into a subsequent portion of alcohol to be dehydrated.

4. A process for separating aqueous normal butyl alcohol from tertiary butyl alcohol which comprises mixing therewith an amount of phthalic anhydride in excess of that necessary to react with the normal butyl alcohol to form the corresponding half ester, heating the mixture until the reaction between the phthalic anhydride and the normal butyl alcohol has been substantially completed, and distilling tertiary butyl alcohol from the mixture free from normal butyl alcohol.

5. A continuous process for dehydrating tertiary butyl alcohol which comprises mixing therewith a slight excess of phthalic anhydride with respect to the water content of said compound, heating the mixture for a length of time sufficient to allow said phthalic anhydride to combine with the water present to form phthalic acid, distilling off the dehydrated tertiary butyl alcohol from the mixture, reconverting the phthalic acid to phthalic anhydride and introducing the regenerated anhydride into a subsequent portion of acid to be dehydrated.

6. The process of purifying impure tertiary butyl alcohol contaminated with a compound included in the group consisting of primary aliphatic alcohols and water, which comprises mixing phthalic anhydride with the impure tertiary butyl alcohol, heating the mixture for a length of time sufficient for the anhydride to combine with the impurity, and distilling pure tertiary butyl alcohol from the mixture.

WILLIAM W. HARTMAN.